United States Patent

Karadgy et al.

[11] Patent Number: 6,116,856
[45] Date of Patent: Sep. 12, 2000

[54] BI-DIRECTIONAL FAN HAVING ASYMMETRIC, REVERSIBLE BLADES

[75] Inventors: Viatcheslav G. Karadgy, Moscow; Yuriy Moskovko, Reytov; Josef Brusilovsky; Lioudmila Popova, both of Moscow, all of Russian Federation; Vance M. Patterson, Morganton, N.C.

[73] Assignee: Patterson Technique, Inc., Blythewood, S.C.

[21] Appl. No.: 09/157,136

[22] Filed: Sep. 18, 1998

[51] Int. Cl.[7] .................................................. B63H 1/26
[52] U.S. Cl. ................ 416/203; 416/223 R; 416/242; 416/DIG. 2; 416/DIG. 5; 29/888.025; 29/889.3; 29/889.6; 29/889.7
[58] Field of Search ............................. 416/214 R, 242, 416/DIG. 2, DIG. 5, 203, 205, 207, 208, 209, 223 R; 29/888.025, 889.3, 889.6, 889.7

[56] References Cited

U.S. PATENT DOCUMENTS

| | | |
|---|---|---|
| 1,977,072 | 10/1934 | Lyman et al. . |
| 2,101,535 | 12/1937 | Engdahl . |
| 2,581,873 | 1/1952 | Morrison . |
| 2,787,448 | 4/1957 | Fawcett . |
| 3,279,684 | 10/1966 | Waters . |
| 4,915,588 | 4/1990 | Brackett . |
| 5,110,263 | 5/1992 | Chiu . |
| 5,244,347 | 9/1993 | Gallivan et al. . |

FOREIGN PATENT DOCUMENTS

| | | |
|---|---|---|
| 2673248 | 8/1992 | France . |
| 4020952 | 1/1992 | Germany . |

*Primary Examiner*—Edward K. Look
*Assistant Examiner*—Ninh Nguyen
*Attorney, Agent, or Firm*—Sughrue, Mion, Zinn, Macpeak & Seas, PLLC

[57] ABSTRACT

A bi-directional fan includes asymmetrically-shaped fan blades wherein, at each transverse cross-section of the blade, the profile of the blade includes a leading portion lying on one side of a straight line connecting the leading and trailing edges of the blade and a trailing portion lying on the opposite side of the straight line. The leading portion of the blade is larger than the trailing portion of the blade, and the point at which the blade's mean line of profile crosses the straight line is closer to the trailing edge than the leading edge. From the leading edge to a point of maximum camber, the shape of the profile of the blade is described by a polynomial expression. From the point of maximum camber to the trailing edge, the shape of the profile of the blade is described by a cosine wave function. The larger leading portion presents a greater forward-curved surface area which allows the blade to move air more efficiently in the forward direction. While the efficiency of the asymmetric fan blade is reduced in the reverse direction, when the fan is used in the forward direction more than 50% of the time, the overall efficiency of the asymmetric-blade fan is greater than that of the symmetric-blade fan. Each asymmetric fan blade can assume either of two oppositely-oriented positions, allowing one set of identical blades to provide a range of different forward and reverse air flow efficiencies.

18 Claims, 6 Drawing Sheets

FIG. 1
FIG. 2
FIG. 3
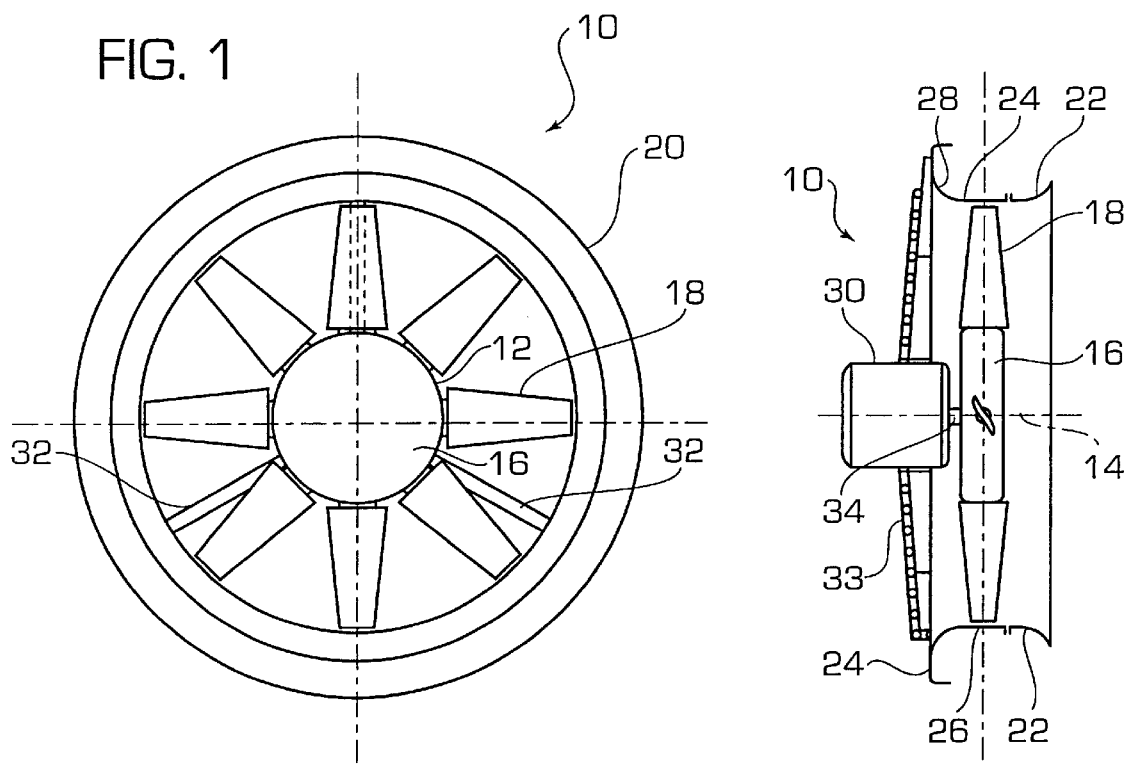
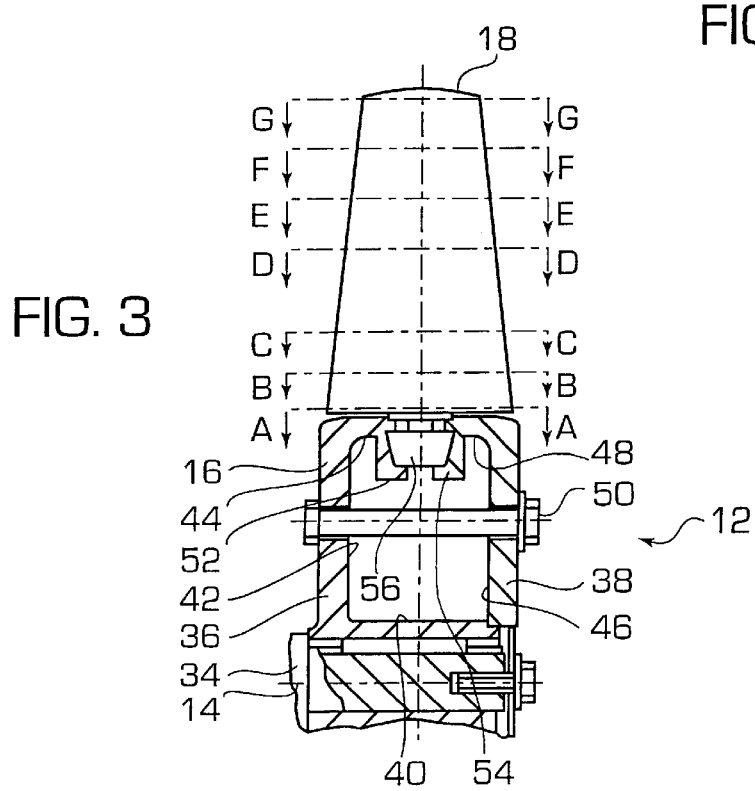

BI-DIRECTIONAL FAN HAVING ASYMMETRIC, REVERSIBLE BLADES

BACKGROUND OF THE INVENTION

1. Field of the Invention

The present invention relates to a reversible (i.e., bi-directional) fan, wherein the direction of air flow is reversed by changing the direction of rotation of the blades of the fan. In particular, the present invention relates to a bidirectional fan having blades that are asymmetric in shape and whose orientation is adjustable.

2. Description of the Related Art

Bi-directional fans used in supply-exhaust ventilation conventionally comprise an impeller having multiple blades that extend radially outward from a central hub to a coaxial, annual shroud. The annual shroud surrounds the impeller such that inner diameter of the annual shroud is greater than the outer diameter of the impeller, allowing the blades to rotate within the shroud with the peripheral edges of the blades in close proximity to the shroud. The impeller is rotated about a central axis by an electric motor which is mounted coaxially and supported by support members which extend radially inward from the annual shroud to the electric motor. The support members are spaced axially from the fan blades so as to avoid mechanical interference therewith. Such bi-directional fans can be mounted within an air duct system or used in a window unit or a built-in wall unit.

In order to move air efficiently in the forward direction (air flow exiting the side of the fan opposite the motor) and the reverse direction (air flow exiting the motor side of the fan), the blades of the conventional bi-directional fan typically have a symmetric, S-shaped profile (i.e., the transverse cross-section of the blade normal to the radial direction). Specifically, the leading portion of the blade lies on one side of a straight line connecting the leading and trailing edges of the blade, and is concave toward the straight line, providing a cupped blade surface capable of efficiently moving air in the forward direction when the blade is rotated in one direction (e.g., counter-clockwise) about the central axis. The trailing portion of the blade lies on the opposite side of the straight line and is concave toward the straight line, providing a cupped blade surface capable of efficiently moving air in the reverse direction when the blade is rotated in the opposite direction (clockwise).

The conventional symmetric fan blade is suitable in ventilation systems where the operational time of the bi-directional fan is roughly 50% in the forward direction and 50% in the reverse direction, since the symmetric fan blade provides approximately the same efficiency in the forward and reverse directions (ignoring air flow differences resulting from air flow blockage caused by the motor). However, in the case of a bi-directional fan having an operational time that is more than 50% in the forward (or reverse) direction, it is desirable that the fan have a greater energy efficiency in the forward direction than in the reverse direction to conserve energy. That is, the overall energy efficiency of the fan is greater with an increase in energy efficiency in the direction of greater use, even at the expense of a corresponding decrease in energy efficiency in the direction of lesser use. Accordingly, there is a need for a bi-directional fan which provides increased operational efficiency in one direction when more than 50% of the fan operation time is in that direction.

The air flow and energy efficiency requirements of a particular ventilation system may impose operational constraints that cannot be met by known bi-directional axial fans. For instance, the forward (e.g., supply) direction air flow and energy efficiency requirements may demand a blade structure that is unacceptably inefficient in the reverse (exhaust) direction. Accordingly, there is a need for a bi-directional fan capable of meeting air flow requirements in one direction without unduly degrading performance in the opposite direction.

One difficulty in designing the blades of a bi-directional ventilation fan for particular operating conditions is that operational requirements (e.g., the percentage of operational time used in the forward and reverse directions) may change over time. Assuming the blades of a ventilation fan have been optimized for particular operating conditions, the fan energy efficiency would be significantly reduced if different operating conditions were to be adopted. Further, it would be very expensive to design and manufacture customized fan blades based on the specific operational requirements of each and every bi-directional ventilation system. Accordingly, there is a need for an adjustable, bi-directional fan capable of providing a variety of different forward and reverse air flow energy efficiencies for a variety of different operating conditions.

SUMMARY OF THE INVENTION

It is an object of the present invention to increase the overall operational efficiency of a bi-directional fan that operates in one direction more often than in the opposite direction.

It is another object of the present invention to increase the operational efficiency of a bi-directional fan in one direction without unduly reducing the operational efficiency in the opposite direction.

It is a further object of the present invention to provide optimal efficiency under a variety of different operating conditions with a single, adjustable, bi-directional fan.

The aforesaid objects are achieved individually and in combination, and it is not intended that the present invention be construed as requiring two or more of the objects to be combined unless expressly required by the claims attached hereto.

In accordance with the present invention, these objects are achieved with a bi-directional fan having asymmetrically-shaped fan blades. Specifically, at each transverse cross-section of the blade, the profile of the blade includes a leading portion lying on one side of a straight line connecting the leading and trailing edges of the blade and a trailing portion lying on the opposite side of the straight line. According to the present invention, the leading portion of the blade is larger than the trailing portion of the blade. That is, the point at which the blade's mean line of profile crosses the straight line is closer to the trailing edge than the leading edge. According to a preferred embodiment, from the leading edge to a point of maximum camber (maximum deviation from the straight line), the shape of the profile of the blade is described by a polynomial expression. From the point of maximum camber to the trailing edge, the shape of the profile of the blade is described by a cosine wave function. Different blade profiles (e.g., different maximum camber and crossover points) can be achieved by adjusting the parameters which describe the shape of the blade profile.

The larger leading portion (relative to a comparable symmetric blade) presents a greater forward-curved surface area (i.e., more than half of the blade surface area lies on one side of the straight line connecting the leading and trailing edges) which allows the blade to move air more efficiently in the forward direction. The energy efficiency of the asymmetric fan blade is reduced somewhat in the reverse direction due to a reduced portion of the blade being curved in the reverse direction (i.e., lying on the opposite side of the straight line). However, when the fan is used in the forward direction more than 50% of the time, the overall energy efficiency of the asymmetric-blade fan is greater than that of the symmetric-blade fan, notwithstanding the reduced energy efficiency in the reverse direction. The parameters which described the shape of the blade profile can be set such that the relative size and shape of the leading and trailing portions correspond to the percentage of operation time in the forward and reverse directions, with the size of the leading portion increasing approximately in proportion to the percentage of operation time in the forward direction to achieve high efficiency.

In accordance with another aspect of the present invention, each asymmetric fan blade can assume either of two oppositely-oriented positions, allowing one set of identical blades to provide a range of different forward and reverse efficiencies. When all of the blades are mounted in the same direction, the fan provides a high overall energy efficiency when the fan is used a particular percentage (greater than 50%) of time in that direction. When the fan is to be used approximately 50% of the time in the forward direction, the fan can provide an energy efficiency equivalent to that of a symmetric-blade fan by mounting one half of the blades in one direction and mounting the other half of the blades in the opposite direction.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 1 is a front axial end view of a bi-directional fan according to an exemplary embodiment of the present invention.

FIG. 2 is a side view of the bi-directional fan shown in FIG. 1.

FIG. 3 is a detailed side view of the impeller according to the exemplary embodiment of the present invention.

DETAILED DESCRIPTION OF THE PREFERRED EMBODIMENT

Figure 4:
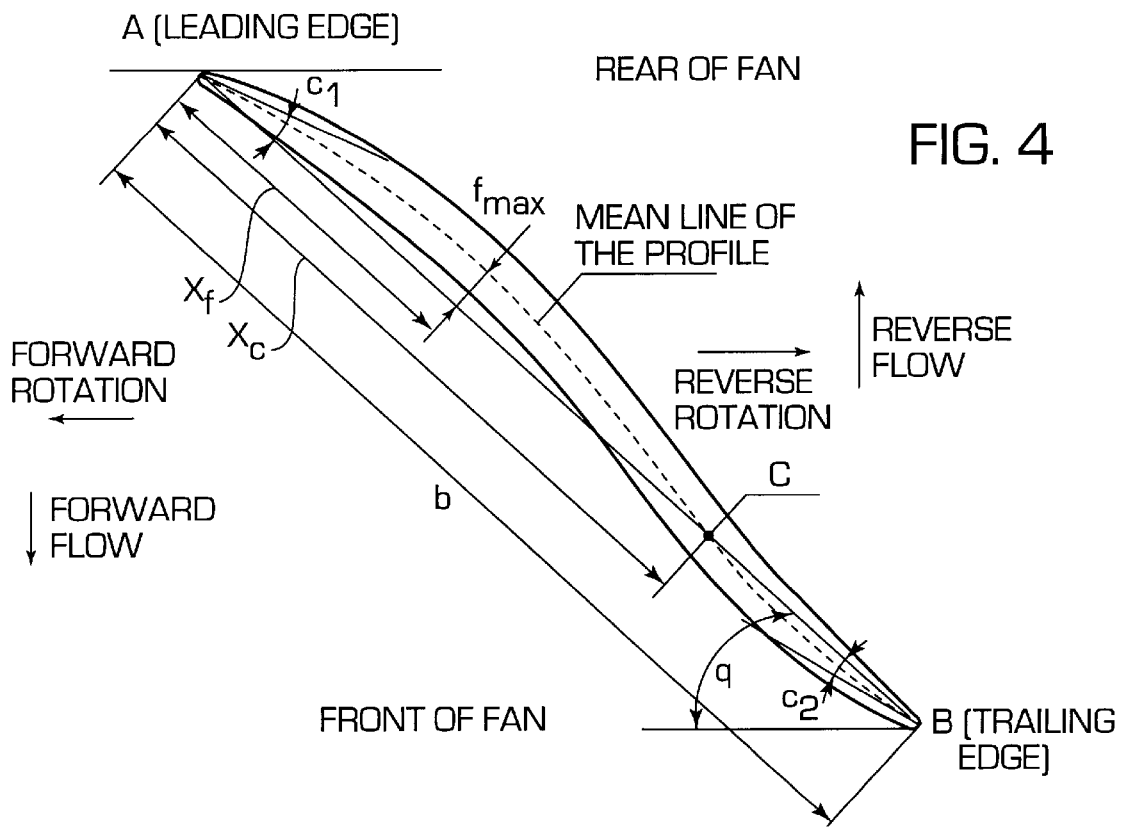
FIG. 4 is a representative transverse cross-sectional profile view of an asymmetric fan blade according to the present invention.

FIGS. 1–3 illustrate an axial flow fan 10 according to an exemplary embodiment of the present invention. The fan comprises an impeller 12 which rotates about a rotation axis 14 and which includes a central hub 16 and a plurality (eight in the exemplary embodiment) of identical blades 18 symmetrically arranged around hub 16 and extending radially outward from hub 16.

An annual outer shroud 20 surrounds the outer circumference of impeller 12, such that the inner diameter of shroud 20 is equal to or greater than the outer diameter of impeller 12 (i.e., the peripheral edges of the blades 18). More specifically, shroud 20 includes a front shroud member 22 and a rear shroud member 24. As shown in FIG. 2, front shroud member 22 flares toward the front axial end of fan 10 from an inner end most proximal to impeller 12 to a front outer end most distal to impeller 12 to provide normal air-entry conditions when impeller 12 is rotating in the reverse direction (clockwise from the front perspective shown in FIG. 1). Rear shroud member 24 includes a cylindrical portion 26 which lies adjacent the peripheral edges of blades 18 and an outer portion 28 which flares toward the rear of fan 10 to provide normal air entry conditions when impeller 12 is rotating in the forward direction (counter-clockwise from the front perspective shown in FIG. 1).

An electric motor 30 is mounted coaxially on the rear side of fan 10 on support members 32 which extend radially between motor 30 and a distal surface of outer portion 28 of rear shroud member 24, and a protection net 33 is secured to support members 32 to cover the rear opening of fan 10. Electric motor 30 is coupled to impeller 12 via an axial mounting shaft 34 and is capable of rotationally driving impeller 12 in the forward direction and in the reverse direction.

As shown in FIG. 3, hub 16 comprises a rear hub member 36 and a front hub member 38. Rear hub member 36 includes an inner cylindrical wall 40 which is coaxial with rotation axis 14, a flat, ring-shaped rear side wall 42 extending from a rear axial end of the inner cylindrical wall 40 along a plane perpendicular to rotation axis 14, and a cylindrical end wall 44 coaxial with the rotation axis 14 and extending from the outer circumferential edge of the rear side wall 42 toward the front axial end. Front hub member 38 includes a flat, ring-shaped front side wall 46 extending from a front axial end of inner cylindrical wall 40 of the rear hub member 36 along a plane perpendicular to rotation axis 14, and a cylindrical end wall 48 coaxial with rotation axis 14 and extending from the outer circumferential edge of front side wall 46 toward the rear axial end. Rear hub member 36 and front hub member 38 are secured to each other with axially extending bolts 50. Axial mounting shaft 34 extends through the axial opening formed by inner cylindrical wall 40 of rear hub member 36 and is fixed thereto.

The inner ends of cylindrical end walls 44 and 48 of rear and front hub members 36 and 38 terminate in opposing C-shaped members 52 and 54. When front and rear hub members 36 and 38 are bolted together, C-shaped members 52 and 54 surround and clamp a root 56 of blade 18 to secure blade 18 to hub 16.

Each blade 18 extends radially from cylindrical end walls 44 and 48 of hub 16 to the inner circumference of cylindrical portion 26 of rear shroud member 24. Each blade 18 has an aerodynamic profile capable of efficiently moving air in both the forward and reverse directions. While the shape and orientation of the transverse cross-sectional profile (taken normal to the radial direction) of blade 18 change as a function of radius, the shape and orientation of the cross-section of blade 18 can be described at any radius in terms of certain geometric parameters.

FIG. 4 illustrates the transverse cross-sectional profile of blade 18 at an arbitrary radius R. For convenience, the blade profile is shown in FIG. 4 in two-dimensions, and the shape of the profile is herein described relative to a straight line. However, it will be understood that a transverse cross-sectional profile of blade 18 at a given radius R actually lies along a cylinder of radius R (rather than in a plane) which is coaxial with rotation axis 14. The following conventions are herein adopted to describe the shape of blade 18. The front of fan 10 is at the bottom of FIG. 4 and the rear of fan 10 is at the top of the FIG. 4. Forward rotation of blade 18 corresponds to counter-clockwise rotation from the front perspective shown in FIG. 1, and causes air to flow in the forward flow direction (i.e., toward the front of the fan). Conversely, reverse rotation of blade 18 corresponds to clockwise rotation from the front perspective shown in FIG. 1, and causes air to flow in the reverse flow direction (toward the rear of the fan). The term "forward" is arbitrarily defined as the direction in which the operation time of the fan is at least 50% and that "reverse" is arbitrarily defined as the direction in which the operation time of the fan is at most 50%. However, these conventions have been adopted only for the convenience of describing the invention. It will be understood that the invention applies equally to other conventions; thus, "forward rotation" could correspond to clockwise rotation with the forward flow direction being toward the rear of the fan and with air flowing toward the rear of the fan more than 50% of the time.

The cross-sectional profile of blade 18 can be described relative to a straight line segment AB joining the leading edge A and trailing edge B of blade 18. The chord (or width) b of the blade at radius R is equal to the length of line segment AB. The angle of profile setting θ of blade 18 at radius R is defined as the angle formed between line segment AB and a co-planar line in a plane normal to rotation axis 14 at the trailing edge B of blade 18. The terms "leading" and "trailing" are arbitrarily defined relative to one of two possible directions of rotation. For purposes of description, the leading edge is herein defined as the edge of the blade which first passes an angular position when the blade is rotating in the counter-clockwise direction. However, it should be understood that the opposite edge of the blade could be defined as the leading edge (since it is the leading edge when the blade rotates in the clockwise direction); thus, either side edge of the blade can be defined as the "leading" edge.

The mean line of profile of blade 18 is depicted in FIG. 4 with a dashed line. Specifically, at each transverse cross-section, the profile of the blade includes a leading portion lying on one side of a straight line connecting the leading and trailing edges of the blade and a trailing portion lying on the opposite side of the straight line. According to the present invention, the leading portion of the blade is larger than the trailing portion of the blade. That is, the point C at which the blade's mean line of profile crosses the straight line is closer to the trailing edge B than the leading edge A.

The mean line of profile deviates from line segment AB such that a tangent to the mean line of profile at the leading edge A forms an angle $\chi_1$ with line segment AB to one side of line segment AB, and a tangent to the mean line of profile at the trailing edge B forms an angle $\chi_2$ with line segment AB to the opposite side of line segment AB, as shown in FIG. 4. From leading edge A, the deviation between the line segment AB and the mean line of profile increases to a maximum camber f (maximum deviation from line segment AB) at a point $x_f$ along line segment AB. The deviation then decreases from point $x_f$ to point C (which is a distance $x_c$ from leading edge A) along line segment AB, where the deviation is 0 and the mean line of profile crosses the line segment AB. From point C to trailing edge B, the deviation between line segment AB and the mean line of profile first increases, on the side of line segment AB opposite that of the maximum camber f, and then decreases to 0 at trailing edge B.

Preferably, between leading edge A and point $x_f$ (which is a distance $x_f$ from leading edge A along line segment AB), the shape of the mean line of profile is described by a polynomial expression, and between point $x_f$ and trailing edge B, the shape of the mean line of profile is described by a cosine function. Specifically, for a normalized blade width (chord=1), assuming the line segment AB coincides with the x-axis with the y-axis normal thereto, the mean line of profile of blade 18 is characterized by:

$$\bar{y}(\bar{x}) = \bar{x} \cdot \tan_{\chi_1} - A\bar{x}^n; \text{ for } 0 \leq \bar{x} \leq \bar{x}_f \tag{1}$$

where $$n = \frac{1}{1 - \frac{f}{\bar{x}_f \cdot \tan X_1}}; A = \frac{\tan X_1}{n \bar{x}_f^{n-1}};$$

$\bar{y}=y/b$; $\bar{x}=x/b$; $\bar{f}=f/b$; $\bar{x}_f=x_f/b$ and $$\bar{y}(\bar{x}) = \frac{\bar{f}}{1+|\cos(k\pi)|}\left\{\cos\left[\frac{k\pi(\bar{x}-\bar{x}_f)}{1-\bar{x}_f}\right]+|\cos(k\pi)|\right\}; \quad (2)$$

for $\bar{x}_f \leq \bar{x} \leq 1.0$

The parameter k is a constant which defines the portion of a cosine wave traced by the second portion of the mean line of profile. Specifically, from $x_f$ to B, the mean line of profile traces $k\pi$ radians of a cosine wave, and values of k between 1 and 1.5 yield a mean line of profile having an asymmetric S-shape. The parameter k is related to the angle $\chi_2$ by:

$$\chi_2 = \tan^{-1}\left[\frac{-\bar{f}k\pi\sin(k\pi)}{(1+|\cos(k\pi)|)(1-\bar{x}_f)}\right] \quad (3)$$

Where the resulting shape of the mean line of profile approximates that of an arch of a circle in the region $0 \leq \bar{x} \leq \bar{x}_f$, the angle $\chi_1$ is related to the maximum camber f and the point $x_f$ along the line segment AB corresponding to the maximum camber by:

$$\chi_1 = 2\tan^{-1}(f/x_f) \quad (4)$$

As can be understood from the above expressions, the shape of the mean line of profile at any radial distance along blade 18 is determined by the parameters $\chi_1$, $x_f$, f and either $\chi_2$ or k. For example, an approximately symmetric S-shaped profile results from setting $x_f=0.25$ b, k=1.5, and setting $\chi_1$ and $\chi_2$ to be nearly equal. Specifically, $\chi_1$ and $\chi_2$ can be made nearly equal by setting $\chi_1$ to be for a nearly symmetric blade, f is determined by:

$$\chi_1 = 2\tan^{-1}(Cf/x_f) \quad (5)$$

where $$C = \frac{-\bar{x}_f k\pi\sin(k\pi)}{2(1-\bar{x}_f)(1+|\cos(k\pi)|)}$$

Figure 5A:
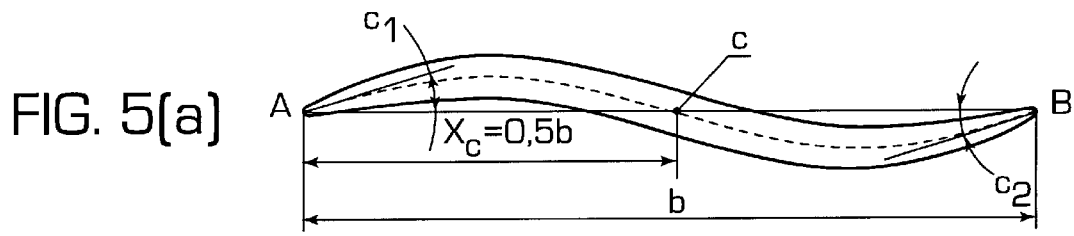
FIGS. 5a–5c are transverse cross-sectional profile views of S-shaped fan blades having cross over points that are 0.5, 0.7 and 0.8 times the chord of the blade, respectively.

Such a symmetric blade profile is shown in FIG. 5a, where the distance $x_c$ of the crossing point C from leading edge A is one half the width of the blade (b/2).

Figure 5B:
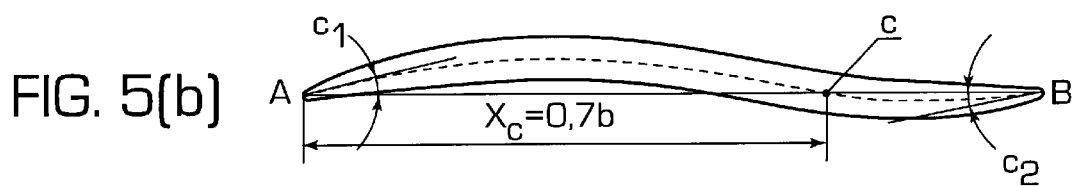
Figure 5C:
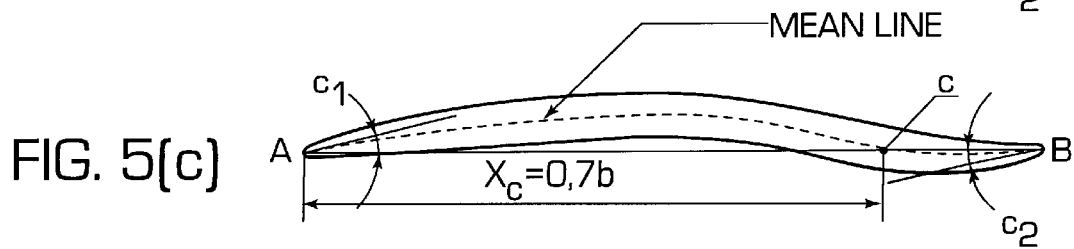

Of greater interest with respect to the present invention are values of these parameters which yield asymmetric blades profiles, where the distance $x_c$ from point A to C is greater than the distance b/2. Different asymmetric profiles result from different values of $\chi_1$, $\chi_2$, $x_f$ and f. FIGS. 5b and 5c illustrate asymmetric blade profiles where $x_c=0.7$ b and $x_c=0.8$ b, respectively. For comparison, the profiles shown in FIGS. 5a–5c all have equal values of maximum camber f in the leading portion of the blade. In FIGS. 5b and 5c, the angle $\chi_1$ is greater than the angle $\chi_2$. As can be derived from the above expressions, $x_c$ is related to k and $x_f$ by:

$$k = \frac{2}{\left[1+\frac{\bar{x}_C-\bar{x}_f}{1-\bar{x}_f}\right]}; \bar{x}_C = \frac{2-k}{k}(1-\bar{x}_f)+\bar{x}_f; \bar{x}_C = x_C/b \quad (6)$$

Fans having asymmetric profiles such as those shown in FIGS. 5b and 5c have a higher flow volume and a higher energy efficiency in the forward direction and exhibit greater overall energy efficiency when the fan operation time is more than 50% in the forward direction. More particularly, a fan having blades with an asymmetric profile, such as those shown in FIGS. 5b and 5c, has a greater efficiency in the forward direction (relative to a comparable symmetric-blade fan) owing to a larger portion of the blade lying on one side of the line segment AB and a larger portion of the blade being concave in the forward direction. Of course, the energy efficiency of the asymmetric fan blade is reduced in the reverse direction due to a smaller portion of the blade lying on the opposite side of the line segment AB and a smaller portion of the blade being concave in the reverse direction. However, it has been demonstrated that, when the fan is used in the forward direction more than 50% of the time, the overall energy efficiency of the asymmetric-blade fan is greater than that of the symmetric-blade fan.

For example, a fan having blades with the symmetric profile shown in FIG. 5a have approximately the same energy efficiency (72% to 74%) in the forward and reverse directions; thus, the efficiency of the symmetric-blade fan is 72% to 74%, regardless of the percentage of operation time in the forward and reverse directions. It has been experimentally determined that, for a fan having asymmetric blades with $x_c=0.7$ b to 0.8 b, the energy efficiency in the reverse direction is reduce to approximately 69% to 70%. However, the relative flow rate in the forward direction is approximately 110% to 120% that of the symmetric-blade fan, and the energy efficiency increases to approximately 76% to 78%. Consequently, when 80% of the fan operation time is in the forward direction and 20% of the fan operation time is in the reverse direction, the mean total efficiency of the asymmetric-blade fan is approximately 78×0.8+70×0.2=76.4; an increase of approximately 3.2% over that of the symmetric-blade fan. Thus, under these operating conditions, the asymmetric fan blade uses less electricity than the comparable symmetric fan for the same amount of work.

In general, the blade profile yielding the maximum energy efficiency is a function of the percentage of use in the forward direction. It has been experimentally found that high overall efficiencies are achieved when the size of the leading portion of the blade is approximately in proportion to the percentage of operation time in the forward direction. Thus, for example, when the percentage of forward operation time is 50%, a symmetric-blade fan with $x_c=0.5$ b yields a high overall efficiency; when the percentage forward operation time is 60%, an asymmetric-blade fan with $x_c=0.6$ b yields a high overall efficiency. Similarly, asymmetric blades with $x_c=0.7$ b, 0.8 b, 0.9 b and b are highly efficient when the percentage of forward operation time is 70%, 80%, 90% and 100%, respectively. Increases in overall energy efficiency in the range of 3% to 6% have been experimentally found using an asymmetric-blade fan.

In FIG. 3, transverse cross-sections at seven different radial distances along blade 18 are respectively designated by letters A–G. Table 1 gives the numerical values of the parameters which characterize the blade profile along each of cross-sections A–G. As explained above, each cross-sectional profile represents a section of a blade crossing a particular cylindrical surface of radius R that is coaxial with rotation axis 14.

TABLE 1

| Cross sec. | R, mm | $\theta$, ° | f, mm | b, mm | $\chi_1$, ° | $\chi_2$, ° |
|---|---|---|---|---|---|---|
| A | 250 | 52.5 | 6.6 | 169 | 15 | 6.5 |
| B | 275 | 47.0 | 5.3 | 166 | 13 | 5.8 |
| C | 300 | 43.0 | 5.1 | 164 | 11.6 | 5.2 |
| D | 350 | 36.0 | 4.5 | 162 | 10.2 | 4.5 |
| E | 400 | 32.0 | 4.0 | 156 | 9.8 | 4.4 |
| F | 450 | 29.0 | 4.0 | 154 | 10.1 | 4.5 |
| G | 500 | 26.0 | 4.2 | 150 | 10.9 | 4.9 |

Figure 6A:
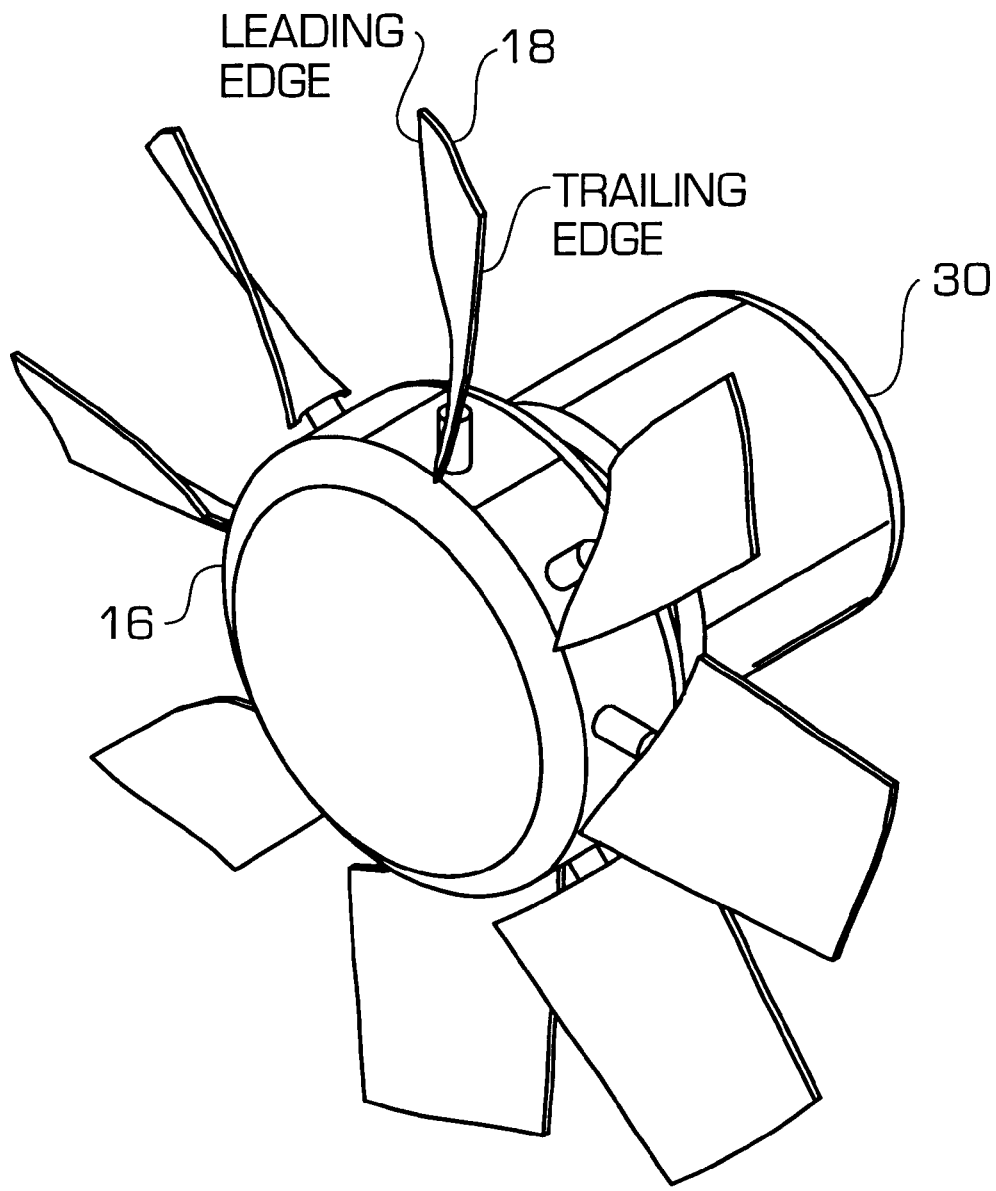
FIG. 6a is perspective view of the impeller according to the exemplary embodiment of the present invention.
Figure 6B:
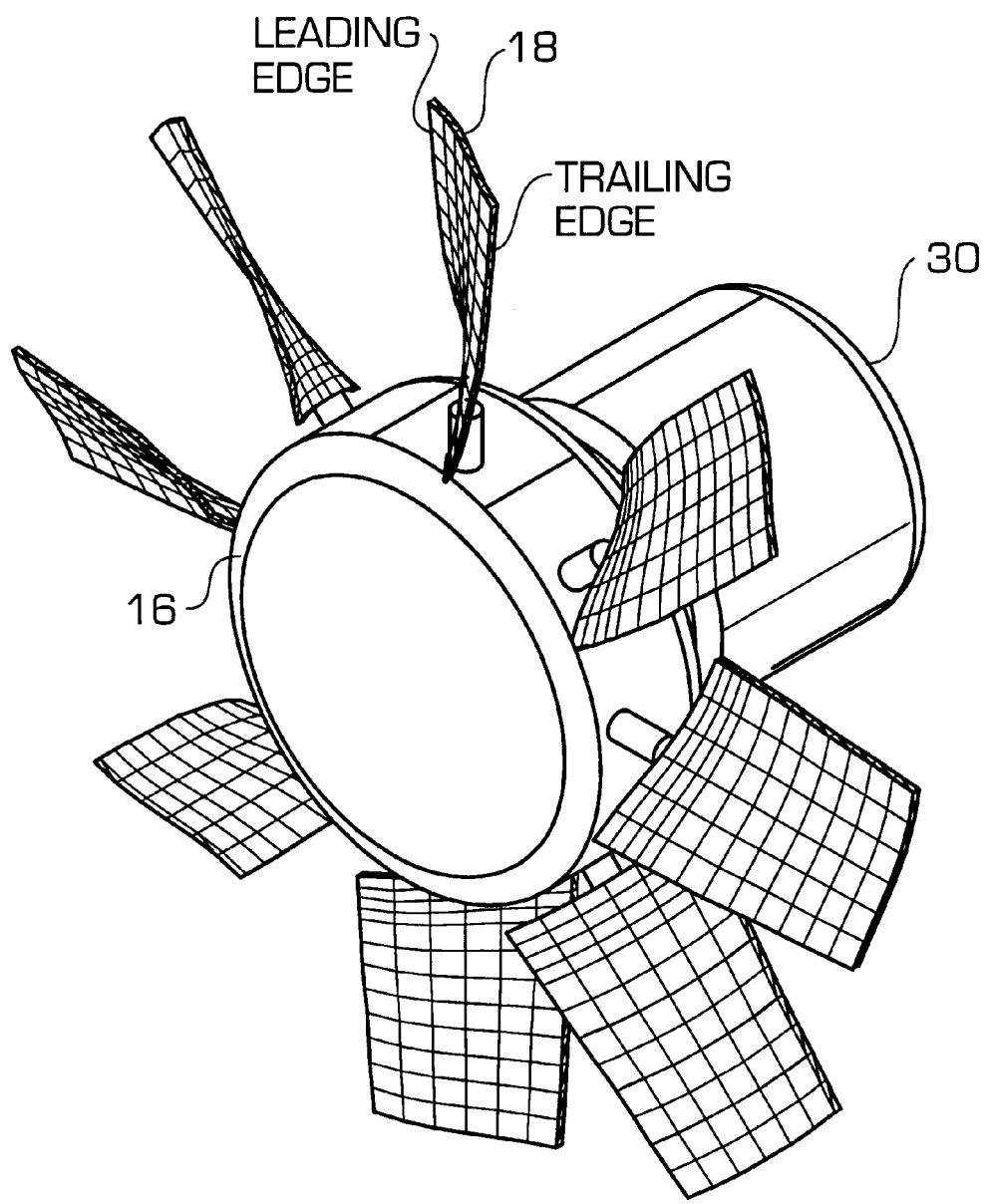
FIG. 6b is the perspective view shown in FIG. 6a with grid lines overlaid on the surface of the blades to illustrate the complex curvature of the blades.
Figure 7A:
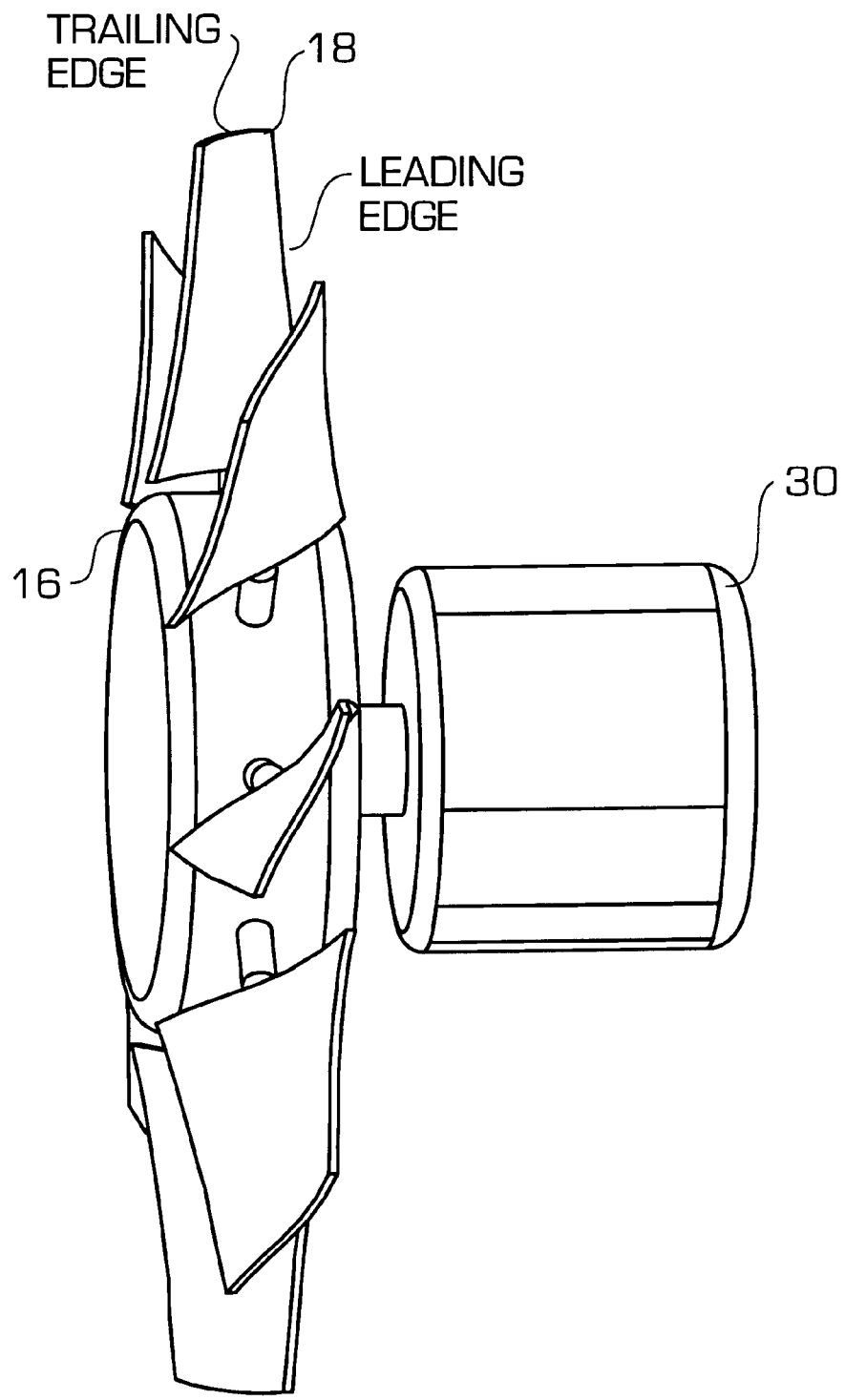
FIG. 7a is a side perspective view of the impeller according to the exemplary embodiment of the present invention.
Figure 7B:
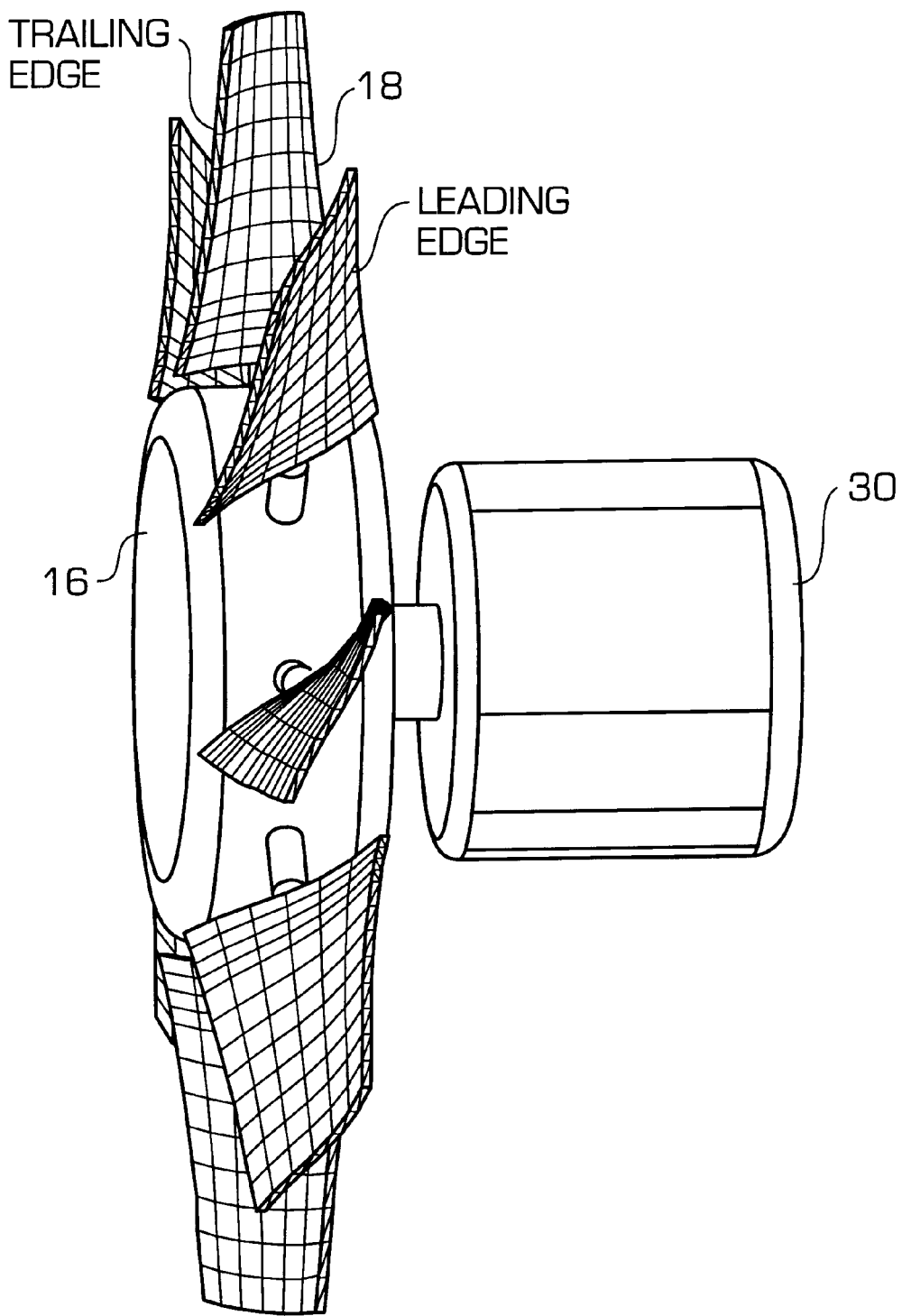
FIG. 7b is the perspective view shown in FIG. 7a with grid lines overlaid on the surface of the blades to illustrate the complex curvature of the blades.

FIGS. 6a and 7a are respectively a perspective view and a side perspective view of impeller 12 shown in FIGS. 1–4 with eight identical blades 18 having the parameters listed in Table 1. FIGS. 6b and 7b are identical to FIGS. 6a and 7a but with grid lines drawn on the surface of the blades in order to illustrate the three-dimensional complex curvature of blades 18.

As best seen in FIGS. 6b and 7b, the angle of profile setting $\theta$ (or blade twist) changes with radius, such that the front surface of the blade increasingly faces toward the front of the fan with increasing radius. Further, the maximum camber f and the chord b decrease with increasing radius. For the blade shown in FIGS. 6a–7b and described in Table 1, the parameters k and $\bar{x}_f$ are approximately constant over the length of the blade, with k=1.3 and $\bar{x}_f$=0.3. In general, parameters k and $\bar{x}_f$ need not be constant, and these parameters can vary as a function of radius to achieve a desired blade shape.

For $\bar{x}_f$=0.25, 0.4 and 0.6, Tables 2, 3 and 4 respectively give examples of values of $\chi_1$ and $\chi_2$ and $\bar{x}_c$ for various values of k between 1 and 1.5, with $\bar{f}$=0.03. Note that k=1 corresponds to a blade profile lying all on one side of the straight line connecting the leading and trailing edges, while k=1.5 corresponds to a blade profile which traces three-fourths of a cosine wave from $x_f$ to the trailing edge.

TABLE 2

| K | 1 | 1.1 | 1.2 | 1.3 | 1.4 | 1.5 |
|---|---|---|---|---|---|---|
| $\chi_1$ | 13.7 | 13.7 | 13.7 | 13.7 | 13.7 | 10.77 |
| $\chi_2$ | 0 | 1.25 | 2.8 | 4.8 | 7.3 | 10.64 |
| $\bar{x}_c$ | 1.0 | 0.86 | 0.75 | 0.65 | 0.57 | 0.5 |

TABLE 3

| K | 1 | 1.1 | 1.2 | 1.3 | 1.4 | 1.5 |
|---|---|---|---|---|---|---|
| $\chi_1$ | 8.6 | 8.6 | 8.6 | 8.6 | 8.6 | 8.6 |
| $\chi_2$ | 0 | 1.57 | 3.5 | 5.9 | 9.1 | 13.3 |
| $\bar{x}_c$ | 1.0 | 0.89 | 0.8 | 0.72 | 0.66 | 0.6 |

TABLE 4

| K | 1 | 1.1 | 1.2 | 1.3 | 1.4 | 1.5 |
|---|---|---|---|---|---|---|
| $\chi_1$ | 5.7 | 5.7 | 5.7 | 5.7 | 5.7 | 5.7 |
| $\chi_2$ | 0 | 2.35 | 5.25 | 8.9 | 13.5 | 19.5 |
| $\bar{x}_c$ | 1.0 | 0.93 | 0.87 | 0.82 | 0.77 | 0.73 |

According to another aspect of the present invention, each asymmetric fan blade 18 can assume either of two oppositely-oriented positions, allowing one set of identical blades to provide a range of different forward and reverse air flow efficiencies. Specifically, each blade 18 can be locked into a forward position, as described above, or a reverse position at an angle of 180° relative to the forward position, such that the trailing edge is positioned where the leading edge would otherwise be. For example, opposing C-shaped members 52 and 54 can clamp blade root 56 into one of two positions, or blade 18 can be pivotally coupled to root 56 with two locking positions.

When all of blades 18 are mounted in the same (e.g., forward) direction, fan 10 provides a high overall efficiency when the fan is used a particular percentage (greater than 50%) of time in that direction. For example, a fan having a plurality of blades oriented in the forward direction and having the specifications set forth in Table 1 is highly efficient when the operational time of the fan is 70% to 80% in the forward direction.

When fan 10 is to be used approximately 50% of the time in the forward direction, the fan can provide an efficiency equivalent to that of a symmetric-blade fan by mounting one half of the blades 18 in the forward direction and mounting the other half of the blades in the reverse direction. Where an even number of blades 18 are mounted on hub 16, to achieve nearly equal forward and reverse efficiencies, it is preferable to reverse the orientation of every other blade such that forward and reverse oriented blades alternate. Thus, by selecting setting the orientation of blades 18, fan 10 can be highly efficient at 50% use in the forward direction or at 70% to 80% in the forward direction, and no loss of efficiency is suffered relative to a symmetric-blade fan at 50% use in the forward direction.

More generally, any number of blades can be reversed, such that a range of forward and reverse air flow efficiencies (corresponding to maximum overall efficiency at different operating conditions) can be achieved. For an eight-blade fan with blades having the specifications set forth in Table 1, Table 5 gives the experimentally determined forward and reverse air flow efficiencies and reverse-direction air flow rate increases (relative to all eight blades in the forward direction) resulting from turning 2, 3 and 4 blades in the reverse direction.

TABLE 5

| number of rearranged blades | efficiency decrease in forward direction, % | efficiency increase in reverse direction, % | flow rate increase in reverse direction, % |
|---|---|---|---|
| 2 | 1.5 | 2.5 | 4.5 |
| 3 | 2 | 7.5 | 7 |
| 4 | 4 | 8 | 11.0 |

As can be seen from Table 5, the efficiency and flow rate in the reverse direction increase with an increase in the number of blades oriented in the reverse direction (relative to the all-blades-forward arrangement). Thus, a broad spectrum of characteristics can be obtained using reversible fan blades having asymmetric profiles, and the same blades can be used to achieve maximum efficiency under a variety of different operating conditions.

The bi-directional fan of the present invention is useful in a variety of residential, commercial and industrial applications, including, but not limited to, supply-exhaust ventilation applications for moving air into and out of enclosed areas, and tunnel ventilation supply-exhaust jet fans, which require impeller diameters between approximately 1250–3000 mm and which require approximately 20–200 kW of power, making the energy efficiency of such fans a very important issue.

Having described preferred embodiments of a new and improved bi-directional fan, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A bi-directional axial flow fan, comprising:

an impeller hub rotatable about an axis;

a motor for rotating said impeller hub in either of two directions about the axis; and a plurality of asymmetric blades extending from said hub in a direction radial to the axis, wherein each of said blades has a cross-sectional profile transverse to the radial direction including:

a leading portion extending from a leading edge of the blade and lying on one side of a line connecting the leading edge of the blade and a trailing edge of the blade; and a trailing portion extending from the trailing edge of the blade and lying on an opposite side of the line, the leading portion and the trailing portion joining at an intersection on the line, which intersection is closer to one of the leading edge of the blade and the trailing edge of the blade than to the other of the leading edge of the blade and the trailing edge of the blade.

2. The fan according to claim 1, wherein a shape of a first section of the leading portion extending from the leading edge to a point of maximum camber is described by a polynomial function, and wherein a shape of a second section of the leading portion extending from the point of maximum camber to the intersection and a shape of the trailing portion are described by a cosine function.

3. The fan according to claim 2, wherein the shape of the first section of the leading portion is described by:

$$\bar{y}(\bar{x}) = \bar{x} \cdot \tan_{X_1} - A\bar{x}^n; \text{ for } 0 \leq \bar{x} \leq \bar{x}_f$$

and the shape of the second section of the leading portion and the shape of the trailing portion are described by:

$$\bar{y}(\bar{x}) = \frac{\bar{f}}{1 + |\cos(k\pi)|} \left\{ \cos\left[\frac{k\pi(\bar{x} - \bar{x}_f)}{1 - \bar{x}_f}\right] + |\cos(k\pi)| \right\};$$

for $\bar{x}_f \leq \bar{x} \leq 1.0$ where $$n = \frac{1}{1 - \frac{\bar{f}}{\bar{x}_f \cdot \tan X_1}}; A = \frac{\tan X_1}{n \bar{x}_f^{n-1}};$$

$\bar{y} = y/b; \bar{x} = x/b; \bar{f} = f/b; \bar{x}_f = x_f/b$ and where x represents a distance from the leading edge along the line, y represents a distance normal to the line, f is the maximum camber, $x_f$ is the distance along the line from the leading edge to a point corresponding to the maximum camber, b is the distance between the leading edge of the blade and the trailing edge of the blade along the line, $\chi_1$ is an angle formed between the line and a tangent to the leading portion at the leading edge of the blade, and k is a constant.

4. The fan according to claim 1, wherein an angle formed between the line and a tangent to the leading portion at the leading edge is greater than an angle formed between the line and a tangent to the trailing portion at the trailing edge.

5. The fan according to claim 1, wherein an orientation of each of said blades with respect to said hub is adjustable.

6. The fan according to claim 5, wherein:

each of said blades is individually adjustable between a first orientation and a second orientation;

in the first orientation, when the blade is rotated in one direction about the axis past a fixed angular position, the leading edge of the blade passes the fixed angular position prior to the trailing edge of the blade; and in the second orientation, when the blade is rotated in an opposite direction about the axis past the fixed angular position, the leading edge of the blade passes the fixed angular position prior to the trailing edge of the blade.

7. The fan according to claim 6, wherein said blades are alternately oriented in the first and second orientation such that adjacent blades have different orientations.

8. The fan according to claim 6, wherein the first orientation is at an angle of 180° with respect to the second orientation.

9. The fan according to claim 5, wherein each of said blades is removable from said impeller hub and securable to said hub in either of two positions.

10. The fan according to claim 5, wherein each of said blades lies along a respective radial axis and each of said blades is rotatable about the respective radial axis.

11. An asymmetric fan blade having a cross-sectional profile including: a leading portion extending from a leading edge of the blade and lying on one side of a line connecting the leading edge of the blade and a trailing edge of the blade; and a trailing portion extending from the trailing edge of the blade and lying on an opposite side of the line, the leading portion and the trailing portion joining at an intersection on the line, wherein a shape of a first section of the leading portion extending from the leading edge to a point of maximum camber is described by a polynomial function, and wherein a shape of a second section of the leading portion extending from the point of maximum camber to the intersection and a shape of the trailing portion are described by a cosine function.

12. The asymmetric fan blade according to claim 11, wherein the intersection is closer to one of the leading edge of the blade and the trailing edge of the blade than to the other of the leading edge of the blade and the trailing edge of the blade.

13. The asymmetric fan blade according to claim 11, wherein the shape of the first section of the leading portion is described by:

$$\overline{y}(\overline{x}) = \overline{x} \cdot \tan_{X_1} - A\overline{x}^n; \text{ for } 0 \leq \overline{x} \leq \overline{x}_f$$

and the shape of the second section of the leading portion and the shape of the trailing portion are described by:

$$\overline{y}(\overline{x}) = \frac{\overline{f}}{1 + |\cos(k\pi)|} \left\{ \cos\left[\frac{k\pi(\overline{x} - \overline{x}_f)}{1 - \overline{x}_f}\right] + |\cos(k\pi)| \right\};$$

for $\overline{x}_f \leq \overline{x} \leq 1.0$ where $$n = \frac{1}{1 - \frac{\overline{f}}{\overline{x}_f \cdot \tan X_1}}; A = \frac{\tan X_1}{n\overline{x}_f^{n-1}};$$

$$\overline{y} = y/b; \overline{x} = x/b; \overline{f} = f/b; \overline{x}_f = x_f/b$$

and where x represents a distance from the leading edge along the line, y is a function of x and represents a distance normal to the line, f is the maximum camber, $x_f$ is the distance along the line from the leading edge to a point corresponding to the maximum camber, b is the distance between the leading edge of the blade and the trailing edge of the blade along the line, $\chi_1$ is an angle formed between the line and a tangent to the leading portion at the leading edge of the blade, and k is a constant.

14. The asymmetric fan blade according to claim 11, wherein an angle formed between the line and a tangent to the leading portion at the leading edge is greater than an angle formed between the line and a tangent to the trailing portion at the trailing edge.

15. A method of constructing an asymmetric fan blade having a cross-sectional profile including a leading portion extending from a leading edge of the blade and lying on one side of a line connecting leading edge of the blade and a trailing edge of the blade, and a trailing portion extending from the trailing edge of the blade and lying on an opposite side of the line, the leading portion and the trailing portion joining at an intersection on the line, the method comprising the steps of:

shaping a first section of the leading portion extending from the leading edge to a point of maximum camber in accordance with a polynomial function;

shaping a second section of the leading portion extending from the point of maximum camber to the intersection in accordance with a cosine function; and shaping the trailing portion in accordance with the cosine function.

16. The method according to claim 15, wherein:

the first section is shaped in accordance with:

$$\overline{y}(\overline{x}) = \overline{x} \cdot \tan_{X_1} - A\overline{x}^n; \text{ for } 0 \leq \overline{x} \leq \overline{x}_f$$

the second section of the leading portion and the trailing portion are shaped in accordance with:

$$\overline{y}(\overline{x}) = \frac{\overline{f}}{1 + |\cos(k\pi)|} \left\{ \cos\left[\frac{k\pi(\overline{x} - \overline{x}_f)}{1 - \overline{x}_f}\right] + |\cos(k\pi)| \right\};$$

for $\overline{x}_f \leq \overline{x} \leq 1.0$ where $$n = \frac{1}{1 - \frac{\overline{f}}{\overline{x}_f \cdot \tan X_1}}; A = \frac{\tan X_1}{n\overline{x}_f^{n-1}};$$

$$\overline{y} = y/b; \overline{x} = x/b; \overline{f} = f/b; \overline{x}_f = x_f/b$$

and where x represents a distance from the leading edge along the line, y is a function of x and represents a distance normal to the line, f is the maximum camber, $x_f$ is the distance along the line from the leading edge to a point corresponding to the maximum camber, b is the distance between the leading edge of the blade and the trailing edge of the blade along the line, $\chi_1$ is an angle formed between the line and a tangent to the leading portion at the leading edge of the blade, and k is a constant.

17. The method according to claim 15, wherein the first section of the leading portion and the trailing portion are shaped such that an angle formed between the line and a tangent to the leading portion at the leading edge is greater than an angle formed between the line and a tangent to the trailing portion at the trailing edge.

18. The fan according to claim 1, wherein a blade twist for each of said asymmetric blades changes in the radial direction.

* * * * *